(12) United States Patent
Huang

(10) Patent No.: US 12,344,451 B2
(45) Date of Patent: Jul. 1, 2025

(54) TELESCOPIC STRUT

(71) Applicant: Ping-Chun Huang, Taichung (TW)

(72) Inventor: Ping-Chun Huang, Taichung (TW)

( * ) Notice: Subject to any disclaimer, the term of this patent is extended or adjusted under 35 U.S.C. 154(b) by 219 days.

(21) Appl. No.: 18/139,328

(22) Filed: Apr. 25, 2023

(65) Prior Publication Data

US 2024/0359897 A1    Oct. 31, 2024

(51) Int. Cl.
*F16M 11/00* (2006.01)
*B65D 81/05* (2006.01)

(52) U.S. Cl.
CPC ................................... *B65D 81/05* (2013.01)

(58) Field of Classification Search
None
See application file for complete search history.

(56) References Cited

U.S. PATENT DOCUMENTS

| | | | | |
|---|---|---|---|---|
| 6,851,652 | B1 * | 2/2005 | Huang | E04G 25/08 |
| | | | | 248/200.1 |
| 8,388,254 | B2 * | 3/2013 | Huang | F16B 7/105 |
| | | | | 403/109.1 |
| 10,890,201 | B2 * | 1/2021 | Tsai | F16B 7/105 |
| 11,255,363 | B2 * | 2/2022 | Tsai | F16B 7/105 |
| 2012/0034023 | A1 * | 2/2012 | Wang | B60P 7/15 |
| | | | | 403/109.3 |
| 2012/0104192 | A1 * | 5/2012 | Huang | B60P 7/15 |
| | | | | 248/125.2 |
| 2012/0193591 | A1 * | 8/2012 | Huang | E04G 25/00 |
| | | | | 254/100 |
| 2014/0133899 | A1 * | 5/2014 | Huang | E04G 25/06 |
| | | | | 403/109.2 |
| 2018/0371773 | A1 * | 12/2018 | Klein | E04G 25/063 |
| 2024/0247506 | A1 * | 7/2024 | Goldspink | E04G 25/065 |

FOREIGN PATENT DOCUMENTS

| | | | | |
|---|---|---|---|---|
| DE | 202011000219 U1 * | 12/2011 | | E04G 25/06 |
| GB | 622131 A | * | 10/1946 | |

* cited by examiner

*Primary Examiner* — Steven M Marsh
(74) *Attorney, Agent, or Firm* — Bruce Stone LLP; Joseph A. Bruce

(57) ABSTRACT

A telescopic strut includes an external tube, a ratchet-based mechanism securely connected to the external tube, an internal tube movably inserted in the external tube through the ratchet-based mechanism, teeth formed on the internal tube and engageable with the ratchet-based mechanism, a lever pivotable to operate the ratchet-based mechanism to extend the internal tube from the external tube, a first contact element for contact with a first portion of a container, and a second contact element connected to the internal tube and operable for contact with a second portion of the container. A pre-abutment mechanism is arranged between the external tube and the first contact element. The pre-abutment mechanism includes a first tube connected to the external tube, a second tube telescopically connected to first tube, and a spring tending to extend the first tube from the second tube.

6 Claims, 6 Drawing Sheets

TELESCOPIC STRUT

BACKGROUND OF INVENTION

1. Field of Invention

The present invention relates to a telescopic strut and, more particularly, to a firm and convenient telescopic strut.

2. Related Prior Art

A telescopic strut can be used to restrain goods in a container. In such a use, the telescopic strut can be compressed between two walls of the container or between a ceiling and floor of the container.

A conventional strut includes an internal tube movably inserted in an external tube. The internal tube is rotated relative to the external tube so that the internal tube is withdrawn into or extended from the external tube to properly install the telescopic strut. However, such manual rotation is a waste of labor and time. In addition, the strut can easily be loosened due to vibration in transportation, thereby failing to restrain the goods.

Another conventional strut includes a ratchet-based mechanism engageable with a toothed internal tube movably inserted in an external tube. The ratchet-based mechanism includes a lever that is pivoted back and forth to operate the ratchet-based mechanism to extend the toothed internal tube from the external tube to cause the internal and external tubes to abut against two portions of a container. However, in the beginning of every task, the ratchet-based mechanism has to be disengaged from the toothed internal tube to allow adjustment of the length of this conventional telescopic strut to a desired value before the lever is pivoted to operate the ratchet-based mechanism to extend the toothed internal tube from the external tube to cause the internal and external tubes to abut against two portions of a container. There are problems with the use of this conventional telescopic strut. Firstly, a user has to use both hands to adjust the length of this conventional telescopic strut. Not rarely, the user accidentally drops this conventional telescopic strut and hurts him- or her-self. This practice is inconvenient and could be dangerous. Sometimes, it requires two persons to adjust the length of this conventional telescopic strut. Secondly, it is difficult to precisely install this conventional telescopic strut in a proper position because its operation is inconvenient as discussed above. To adjust the position of this conventional telescopic strut, the user has to experience the above-mentioned inconvenience again.

The present invention is therefore intended to obviate or at least alleviate the problems encountered in the prior art.

SUMMARY OF INVENTION

It is the primary objective of the present invention to provide a firm and convenient telescopic strut.

To achieve the foregoing objective, the telescopic strut includes an external tube, a ratchet-based mechanism securely connected to the external tube, an internal tube movably inserted in the external tube through the ratchet-based mechanism, teeth formed on the internal tube and engageable with the ratchet-based mechanism, a lever pivotable to operate the ratchet-based mechanism to extend the internal tube from the external tube, a first contact element for contact with a first portion of a container, and a second contact element connected to the internal tube and operable for contact with a second portion of the container. A pre-abutment mechanism is arranged between the external tube and the first contact element. The pre-abutment mechanism includes a first tube connected to the external tube, a second tube telescopically connected to first tube, and a spring tending to extend the first tube from the second tube.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF PREFERRED EMBODIMENT

Figure 1:
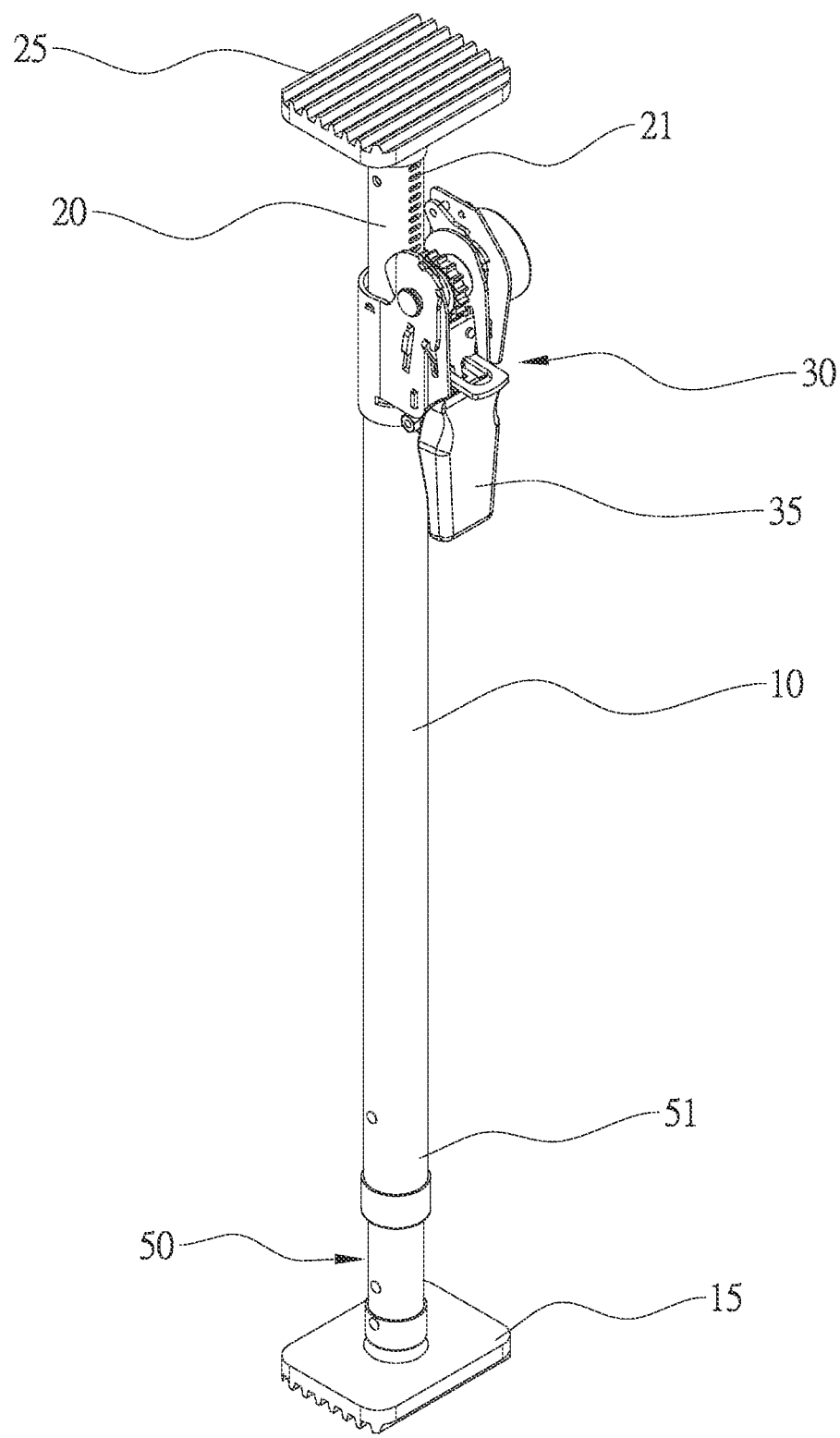
FIG. 1 is a perspective view of a telescopic strut according to the first embodiment of the present invention.

Referring to FIG. 1, a telescopic strut includes an external tube 10, an internal tube 20, a ratchet-based mechanism 30 and a pre-abutment mechanism 50 according to the preferred embodiment of the present invention. As the spirit of the present invention, the pre-abutment mechanism 50 is arranged between an end of the external tube 10 and a contact element 15. The contact element 15 is used to contact a portion of a container such as a wall, a ceiling and a floor.

The ratchet-based mechanism 30 includes a lever 35. The ratchet-based mechanism 30 is attached to another end of the external tube 10.

The internal tube 20 is formed with a series of teeth 21. An end of the internal tube 20 is inserted in the external tube 10 through the ratchet-based mechanism 30. A contact element 25 is pivotally connected to another end of the internal tube 20. The contact element 25 is used to contact a portion of a container such as a wall, a ceiling and a floor.

The lever 35 is pivoted back and forth to operate the ratchet-based mechanism 30 to extend the internal tube 20 from the external tube 10 so that the contact elements 15 and 25 are firmly abutted against two portions of the container. Thus, the telescopic strut restrains goods in the container.

Figure 2:
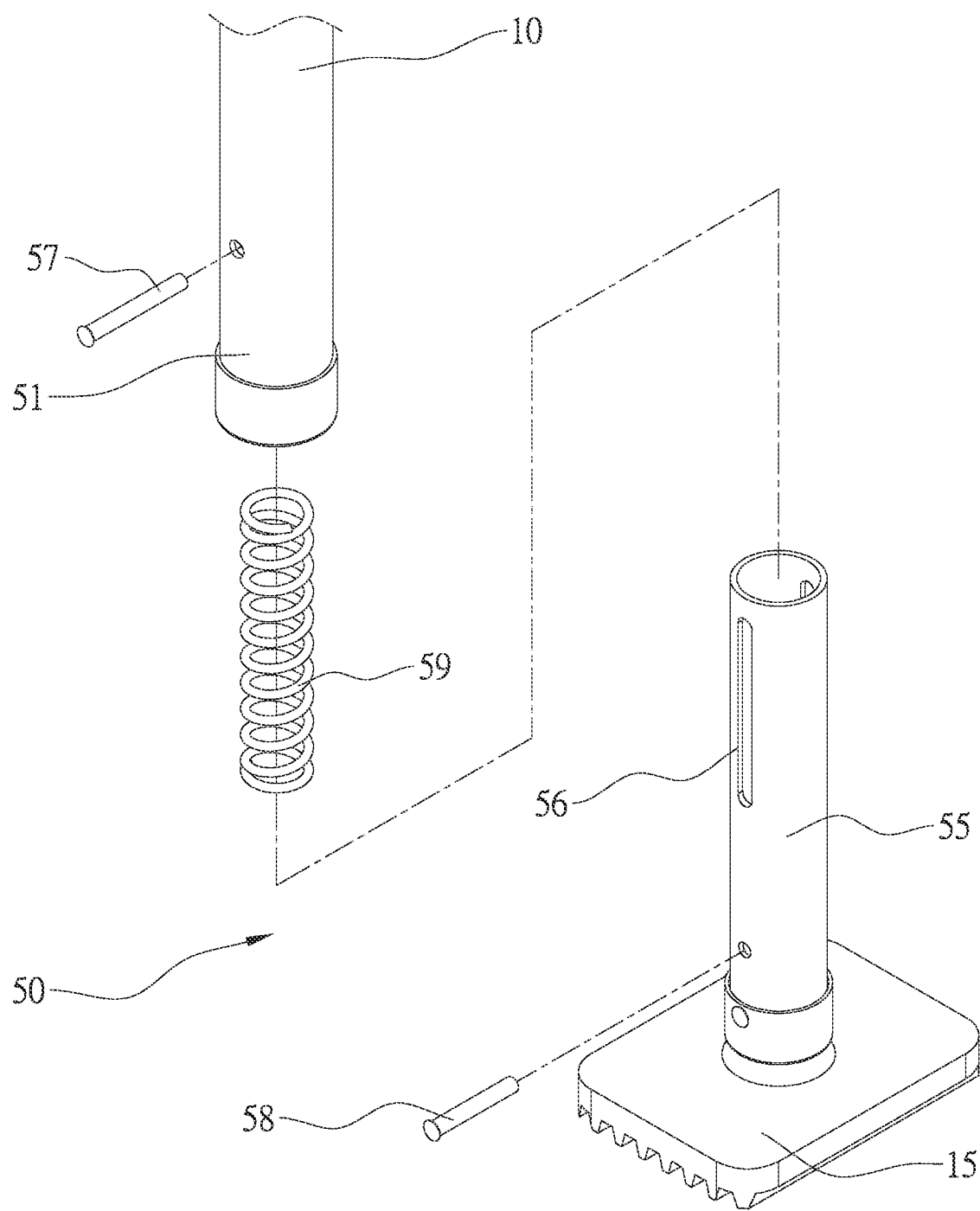
FIG. 2 is a partial and exploded view of the telescopic strut shown in FIG. 1.
Figure 3:
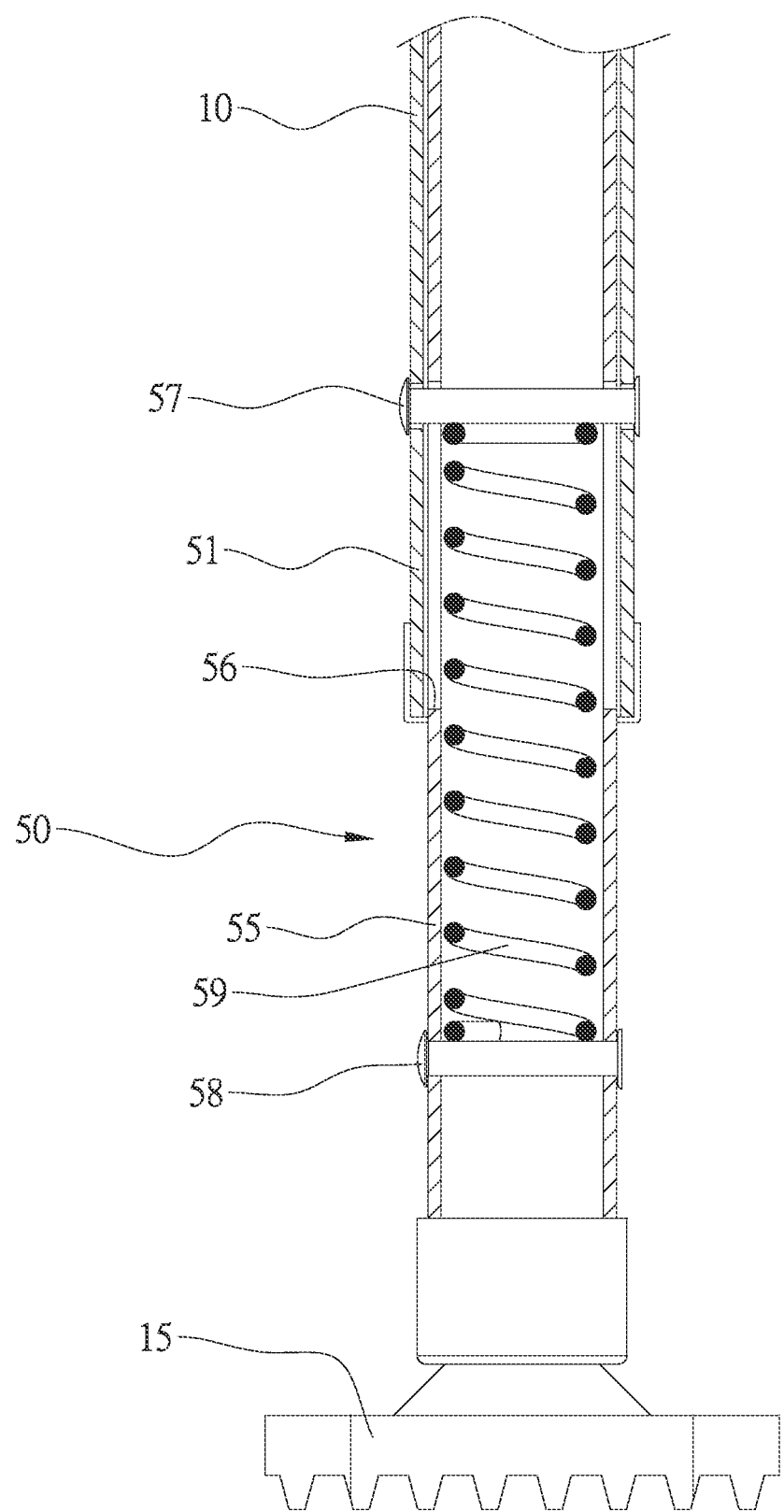
FIG. 3 is a partial and cross-sectional view of the telescopic strut shown in FIG. 1.

Referring to FIGS. 2 and 3, the pre-abutment mechanism 50 includes a spring 59 arranged between two tubes 51 and 55 so that the spring 59 tends to extend the tubes 51 and 55 from each other. The tube 51 and the external tube 10 is made in one piece. The tube 51 is inserted in the tube 55, or vice versa. Two slots 56 are made in a section of the tube 55 opposite to the contact element 15. A pin 57 is inserted in the tube 51. The pin 57 is movably inserted in the slots 56 so that the distance of the movement of the tubes 51 and 55 relative to each other is limited by the length of the slots 56. A pin 58 is inserted in the tube 55. The spring 59 is compressed between the pins 57 and 58 so that the spring 59 tends to extend the tubes 51 and 55 from each other.

Figure 4:
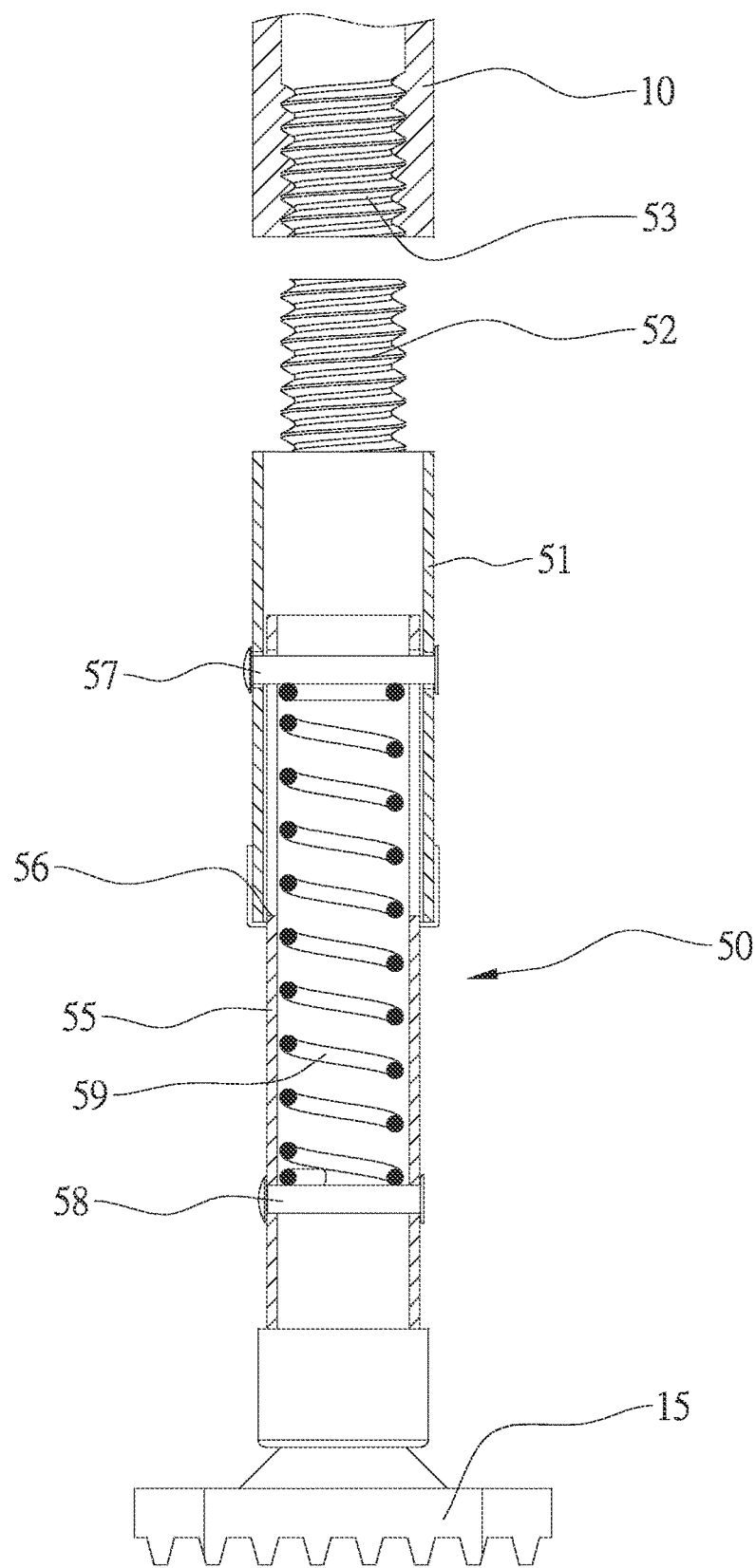
FIG. 4 is a partial and cross-sectional view of a telescopic strut according to the second embodiment of the present invention.

Referring to FIG. 4, there is a telescopic strut according to a second embodiment of the present invention. The second embodiment is identical to the first embodiment except for that the tube 51 is connected to the external tube 10. That is, the tube 51 and the external tube 10 are two individual elements. The tube 51 is formed with a connective end 52 that is a threaded section. The external tube 10 is formed with a connective end 53 that is a screw hole. The connective end 52 of the tube 51 is engaged with the connective end 53 of the external tube 10. The second embodiment allows modification of a convention telescopic strut to include the pre-abutment mechanism 50. The tube 51 can be connected to external tube 10 by other proper means.

The pre-abutment mechanism 50 uses the spring 59 to allow firm but not too firm contact of the contact elements 15 and 25 with two portions of the container. Details about this practice will be given later.

Figure 5:
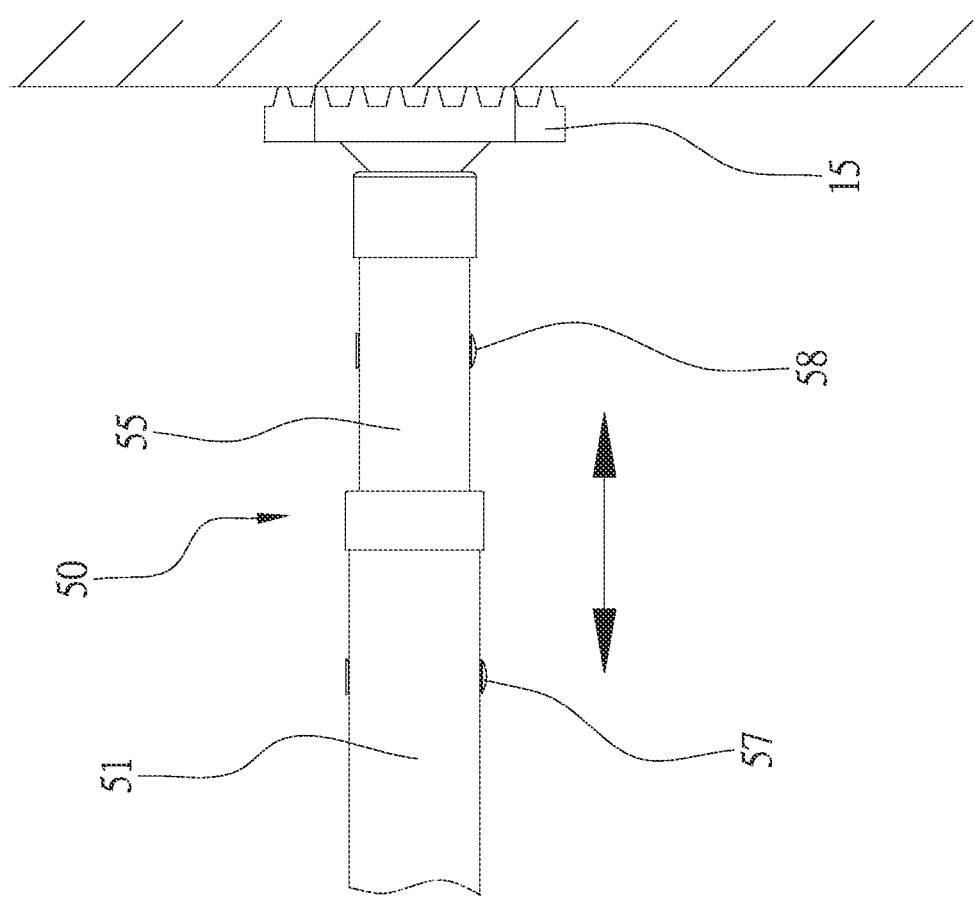
FIG. 5 is a partial and side view of the telescopic strut shown in FIG. 1 or FIG. 4.
Figure 6:
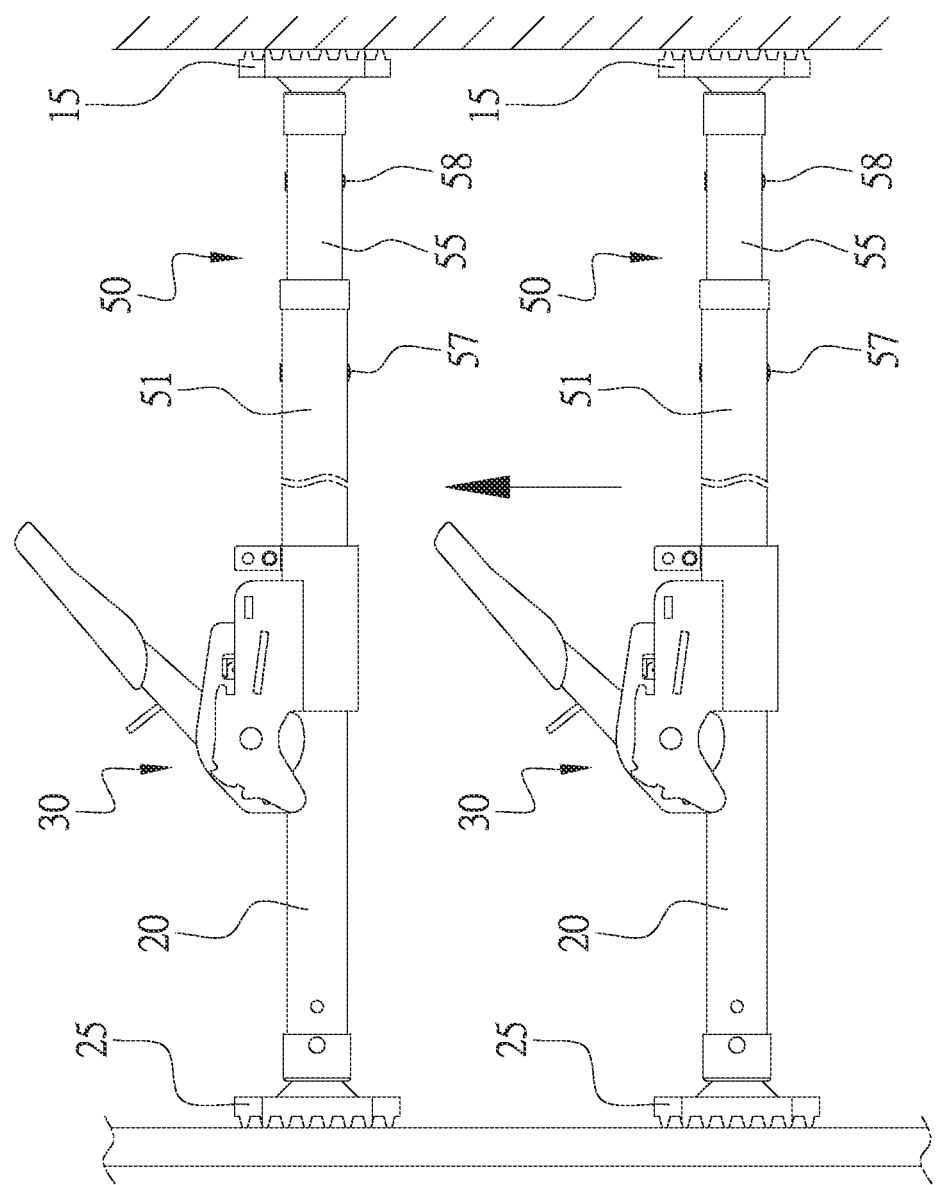
FIG. 6 is a side view of the telescopic struts as shown in FIG. 1 in two positions.

Referring to FIGS. 1, 5 and 6, the operation of the telescopic strut of the present invention is described. In operation, the ratchet-based mechanism 30 is disengaged from the teeth 21 of the internal tube 20 to allow movement of the internal tube 20 relative to the external tube 10 so that the length of the telescopic strut is about the distance between two portions of the container.

Then, in a first phase, the lever 35 is pivoted back and forth to operate the ratchet-based mechanism 30 to extend the internal tube 20 from the external tube 10 to bring the contact elements 15 and 25 with two portions of the container.

The pre-abutment mechanism 50 renders the contact of the contact elements 15 and 25 with the portions of the container firm so that the telescopic strut will not fall. The pre-abutment mechanism 50 renders the contact of the contact elements 15 and 25 with the portions of the container allows not too firm, thereby allowing movement of the telescopic strut relative to the container upward as indicated by an arrow head (or downward) to a proper position.

In a second phase, the lever 35 is pivoted back and forth to operate the ratchet-based mechanism 30 to further extend the internal tube 20 from the external tube 10 to enhance the contact of the contact elements 15 and 25 with two proper portions of the container very firm to avoid movement of the telescopic strut relative to the container. Now, the pin 57 is in contact with an end of each of the slots 56 to avoid withdrawing of the tube 55 into the tube 51.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A telescopic strut comprising an external tube, a ratchet-based mechanism securely connected to the external tube, an internal tube movably inserted in the external tube through the ratchet-based mechanism, teeth formed on the internal tube and engageable with the ratchet-based mechanism, a lever pivotable to operate the ratchet-based mechanism to extend the internal tube from the external tube, a first contact element for contact with a first portion of a container, and a second contact element connected to the internal tube and operable for contact with a second portion of the container, characterized in comprising a pre-abutment mechanism between the external tube and the first contact element, wherein the pre-abutment mechanism comprises a first tube connected to the external tube, a second tube telescopically connected to the first tube, and a spring extending to the first tube from the second tube.

2. The telescopic strut according to claim 1, wherein the second tube of the pre-abutment mechanism is movably inserted in the first tube of the pre-abutment mechanism.

3. The telescopic strut according to claim 1, the pre-abutment mechanism further comprises a first pin transversely inserted in the first tube of the pre-abutment mechanism and a second pin transversely inserted in the second tube of the pre-abutment mechanism, wherein the second tube comprises two slots for movably receiving the first pin, wherein the spring is compressed between the first and second pins.

4. The telescopic strut according to claim 1, wherein the first tube of the pre-abutment mechanism is made in one piece with the external tube.

5. The telescopic strut according to claim 1, wherein the first tube of the pre-abutment mechanism and the external tube are two individual elements, wherein the external tube is formed with a connective end, wherein the first tube of the pre-abutment mechanism is formed with a connective end connected to the connective end of the external tube.

6. The telescopic strut according to claim 5, wherein the connective end of the external tube is a screw hole, wherein the connective end of the first tube of the pre-abutment mechanism is a threaded section inserted in the screw hole.

* * * * *